3,114,724
LOW TEMPERATURE EXPANSION OF LIQUID ORGANIC POLYSULFIDE POLYMER WITH METAL HYDRIDES, BOROHYDRIDES OR ALUMINUM HYDRIDES
Byron A. Hunter, Woodridge, Conn., assignor to United States Rubber Company, New York, N.Y., a corporation of New Jersey
No Drawing. Filed Mar. 5, 1962, Ser. No. 177,233
12 Claims. (Cl. 260—2.5)

This invention is concerned with cellular "polysulfide rubbers" and with a process for producing the same. More particularly, the invention relates to a method involving mixing a liquid organic polysulfide rubber with an oxidative curative for such rubber along with a water sensitive hydrogen containing compound, the resulting liquid mixture being capable of simultaneously curing and expanding at ambient temperatures to form a solid, cured and expanded rubber.

This application is a continuation-in-part of my co-pending application Serial No. 68,687, filed November 14, 1960, and now abandoned.

The term "polysulfide rubber" is intended to embrace those synthetic rubbers that have come to be known as "Thiokol rubbers" and includes the materials described, for example, in U.S. Patent 2,466,963, Patrick et al., April 12, 1949, and at Ind. Eng. Chem. 43, 324–328 (1951). They may be described as polyalkylene polysulfides, or polythiopolymercaptans. They are also referred to as olefin polysulfide rubbers. Such organic polysulfide rubbers are available under the trade name of "Thiokol" from the Thiokol Corporation and they are usually reaction products of sodium sulfide (or polysulfides) with halogenated organic compounds such as ethylene dichloride, propylene dichloride, di-2-chloroethyl formal, 1,2,3-trichloropropane, or the like.

It is well known that these liquid organic polysulfide polymers can be cured to a solid, rubbery state by the action of oxidizing agents, whether inorganic oxidizing agents such as iodine or oxygen-containing salts, e.g., the chromates, manganates, permanganates, molybdates, etc., or oxides or peroxides, especially those of metals such as lead dioxide, tellurium dioxide, sodium peroxide, as well as per compounds such as potassium persulfate, hydrogen peroxide or the like, or whether organic oxidizing materials, including peroxides, hydroperoxides, and the like, such as benzoyl peroxide, dicumyl peroxide, cumene hydroperoxide, etc., as well as quinone dioxime, 2,4-6-trinitrobenzene, m-dinitrobenzene, etc. Oxidizing materials apparently react with sulfhydryl groups (—SH) in the polymer, removing hydrogen to form water, and leaving a free valence on the sulfur atom to serve as a site for formation of a cross-linkage with a similar site formed in the same way on another molecule of the polymer. Thus, upon addition of an oxidizing agent to the liquid organic polysulfide polymer, a curing reaction takes place, even at room temperature, leading to the formation of a solid, cured material resembling a vulcanized rubber. This curing reaction may be speeded up by application of heat, if desired. The invention is particularly adapted to those polysulfide rubbers which are liquid in the uncured state and which can be cured to a solid rubbery state in the presence of oxidizing agents such as lead dioxide, tellurium dioxide, cumene hydroperoxide, etc.

As noted, the curing reaction involves formation of water within the mass. The present invention takes advantage of this fact to blow the polysulfide rubber at the same time that cure is taken place. This is accomplished by having present in the mixture a hydrogen containing substance which is sensitive to water, that is, a substance which decomposes in the presence of water to liberate hydrogen gas. The water sensitive hydrogen containing substances that can be used in my process include those compounds known as metal hydrides and particularly the alkali and alkaline earth metal hydrides as well as the so-called metal borohydrides, especially the alkali metal borohydrides, and the alkali metal aluminum hydrides or alkaline earth metal aluminum hydrides. Thus, sodium hydride, calcium hydride, magnesium hydride, potassium borohydride, sodium borohydride, lithium aluminum hydride, sodium aluminum hydride, and calcium aluminum hydride, are examples of water sensitive hydrogen-containing compounds which can be used for the purposes of the invention.

The production of cellular rubbers by the use of chemical blowing agents is well-known. Prior art procedures depend upon the decomposition of heat-sensitive organic or inorganic substances to produce gaseous products capable of forming a cellular structure within the rubbery mass. Normally, the blowing agent is incorporated into the rubber composition at temperatures well below the decomposition temperature of the blowing agent, and the rubber-blowing agent mix, together with the necessary curing agents, is then heated to curing temperature in a suitable mold or oven, whereupon the blowing agent decomposes as the rubber composition is cured. In such procedures it is essential that the rate of cure and the rate of decomposition of the blowing agent be such that the rubber composition attains sufficient strength to retain the gas within the mass. At the same time it is required that the rubber remain in an expandable state at the decomposition temperature of the blowing agent. In any case, heat is required for the curing and blowing of the rubber.

In the present invention the expansion of the liquid polysulfide rubber is accomplished without the necessity for application of heat by the use of a metal hydride or borohydride as the blowing agent. These substances remain in a stable, undecomposed state when dry but decompose in the presence of water to produce hydrogen gas which is capable of producing a cellular structure within the properly conditioned rubber mass. As has been previously stated, the blowing agent of the invention is used in a liquid polysulfide polymer in conjunction with an oxidizing curing agent. It is considered that the function of such curing agents is to oxidize the free sulfhydryl (—SH) groups in the polysulfide polymer to disulfide (—S—S—) linkages, producing cross-linking and curing of the polymer. This oxidation reaction, as stated previously, is accompanied by the formation of small amounts of water which, under the conditions of the invention, effectively attacks the incorporated metal hydride or borohydride to form hydrogen gas, thus producing a cellular structure in the rubbery mass. It is pertinent that the water which initiates the decomposition of the blowing agent does not become available until the curing process starts, and sufficient tensile strength is developed within the rubbery mass to retain the gas as it is produced. At the same time, the cure occurs gradually and at such a rate as to permit expansion of the partially cured mass into a cellular structure before sufficient strength is developed to prevent the desired expansion from taking place. Ultimately a full cure is attained, and a stable cellular structure is produced. The retention of the gas may also be aided by the selection of polysulfide polymers possessing sufficient liquid viscosity in the uncured state to effectively retain the gas bubbles initially produced in the process.

The blowing agent of the invention can be incorporated in the liquid polysulfide polymer and kept under suitably anhydrous conditions until the time of application. As is the case in current commercial practice in the art of producing rubbery vulcanizates from liquid polysulfide polymers, the curing agent will be added just prior to use and thus will perform the double function of curing the polymer and decomposing the blowing agent, resulting in the formation of an expanded and cured product. In some cases it is convenient to allow the polysulfide composition containing the metal hydride or borohydride and the curatives to stand at room or ambient temperature (e.g., around 10–35° C.) overnight or for several days. During this period expansion and cure slowly take place, and a stable cellular product is produced. A particularly valuable application of this technique will be found in foamed-in-place caulking and gasketing.

The quantity of metal hydride or borohydride used may vary over wide limits depending upon the degree of expansion desired. Generally, the quantity of the blowing agent used will be between 0.1% and 10% of the polysulfide rubber used. However, greater or less than the quantities indicated can be used; and it is not intended to limit the invention to the quantities of the blowing agent described. Likewise the amount of curing (oxidizing) agent may be adjusted over a considerable range to provide proper cure and to effectively decompose the blowing agent. In any case the amount of oxidizing agent employed may be the same as that conventionally used for curing the polysulfide rubber. It will be understood that the amounts of blowing agent and of oxidizing curing agent may vary with the polysulfide polymer used and with the properties desired in the expanded rubber.

The polysulfide rubber composition may also include other compounding ingredients such as carbon black, titanium dioxide, clays, or other fillers, as well as other compounding ingredients normally employed in the formulation of liquid polysulfide polymers. Although heat is generally not required to effect the cure of the polymer, the composition can be subjected to moderately elevated temperatures (generally not more than 100° C.) in cases where more rapid curing of the rubber is desired. The degree of heating, however, will be substantially less than that required for gaseous decomposition of the blowing agents in the absence of the oxidizing curatives employed in my process. Activators such as tris (dimethylaminomethyl) phenol or diphenyl guanidine may be employed. Acidic substances such as stearic acid, for example, function as cure retarders, particularly in the lead dioxide cure.

A variety of oxidizing curatives may be used, the preferred material depending upon the type of liquid polysulfide rubber used, the time of cure desired, and upon the color requirements to be met. Typical curing agents include lead dioxide, cumene hydroperoxide, tellurium dioxide and iodine. Other curatives such as quinone dioxime, 2,4,6-trinitrobenzene, m-dinitrobenzene, etc., may be used—generally in the presence of activators such as diphenylguanidine, sulfur, etc. In general, basic substances such as tri (dimethylamino methyl) phenol ("DMP-30") activate the cure whereas acidic substances tend to retard the cure. Driers such as lead octoate and manganese or cobalt salts are useful in the curing of the polysulfide rubber. If desired, combinations of oxidizing agents may be employed to give the desired characteristics to the expanded product. Incorporation of other polymeric substances such as epoxy resins, butadiene-acrylonitrile polymers, phenolic resins, and so forth, may be desirable to impart special properties to the product. Combinations of different types of polysulfide rubbers will present advantages in certain applications.

The following examples, in which all parts and percentages are expressed by weight, will serve to illustrate the practice of the invention in more detail.

*Example 1*

The polysulfide rubber employed in this and subsequent examples was a condensation product of 98 mole-percent bis-beta-chloroethyl formal and 2 mole-percent of 1,2,3-trichloropropane with sodium polysulfide, having an equivalent weight of 1710 by mercaptan end group analysis, and having a viscosity of 560 poises at 30° C. as measured by means of a Brookfield viscometer. Such a liquid material is commercially available under the name "Thiokol LP-2." 100 parts of the foregoing polymer was mixed with 30 parts of semi-reinforcing carbon black ("Pelletex") and 1 part of stearic acid. To 50 g. of this mixture was added 0.1 g. (0.2%) of finely divided calcium hydride powder. The materials were well mixed and then 5 g. of a paste consisting of 50% lead peroxide, 45% dibutyl phthalate and 5% stearic acid was thoroughly blended in. Such a paste is commercially available under the name "Thiokol Accelerator C-5." The mixture was allowed to stand overnight at room temperature. A well expanded solid rubbery product was obtained which gave a measured density of 0.84 g. per cc. A similarly prepared sample containing .05 g. of calcium hydride powder showed a somewhat higher density (0.92 g./cc.). A sample prepared in a similar manner with no blowing agent had a density of 1.28.

*Example 2*

One-tenth g. of sodium borohydride was added to 50 g. of Thiokol LP-2 polymer and the composition was thoroughly blended with 5 g. of Thiokol Accelerator C-5. The mixture after standing at room temperature overnight had cured to a well expanded rubbery product having a density of 0.64 g. per cc. Similar preparations made with 0.05 g. sodium borohydride and with 0.02 g. of sodium borohydride each gave a well expanded rubbery product showing densities of 0.67 and 0.82, respectively.

*Example 3*

One-tenth g. of powdered calcium hydride was mixed into 50 g. of Thiokol LP-2 liquid polymer. Five g. of Thiokol Accelerator C-5 was blended in and the mixture was allowed to stand at room temperature for thirty minutes. It was then placed in an oven at 70° C. for one hour. An expanded and cured rubbery product was obtained which showed a density of 0.81 g. per cc. In a similar experiment in which the calcium hydride was replaced with one-tenth g. of sodium borohydride, the density of the product after ½ hour at 70° C. was 0.77.

*Example 4*

One-tenth g. of sodium borohydride was added to 50 g. Thiokol LP-2 liquid polymer. After thorough mixing 5.0 g. of tellurium dioxide was blended in. The mixture was placed in a 70° C. oven for two hours. A well expanded, cured rubber was obtained ($d=0.69$).

*Example 5*

One-tenth g. of powdered calcium hydride was mixed with 50 g. of Thiokol LP-2 liquid polymer. Then six g. of cumene hydroperoxide and twenty-two drops of dimethyl amino methyl phenol (DMP-30) were mixed into the viscous fluid composition. After standing at room temperature overnight a well expanded light colored soft rubber sponge was obtained which had a density of 0.47. In an exactly similar experiment using 0.25 g. of powdered calcium hydride in place of the 0.1 g. used above, a soft, cellular rubbery product was obtained which had a density of 0.35. A sample prepared with no blowing agent but otherwise similar was not expanded and had a density of 1.16.

*Example 6*

One-quarter g. of a 50% dispersion of sodium hydride in oil was added to 50 g. of Thiokol LP-2 liquid polymer. To the well blended mixture was added six g. of dicumyl peroxide and 22 drops of dimethylamino methyl phenol ("DMP-30"). After thorough blending the mixture was allowed to stand overnight at room temperature. A well expanded cured rubbery product was obtained which had a density of 0.62.

Example 7

One-tenth g. of sodium borohydride was mixed into 50 g. of Thiokol LP-2 liquid polymer. To this was added 6 g. of cumene hydroperoxide and 22 drops of dimethylamino methyl phenol (DMP-30). The mixture was very well mixed and allowed to cure overnight at room temperature. A cellular rubbery product was obtained which had a density of 0.72.

Example 8

One-half gram of magnesium hydride was mixed into 50 g. of Thiokol LP-2 polymer and the composition was then thoroughly mixed with 50 g. of Thiokol Accelerator C-5. The mixture was allowed to stand at room temperature overnight. The resulting cured rubbery product was cellular in structure and had a density of 0.56. A similarly prepared mix after two hours in the 70° C. oven exhibited a density of 0.50.

Example 9

One-tenth gram of powdered potassium borohydride was added to 50 g. of Thiokol LP-2 polymer and the composition was well mixed with 5 g. of Thiokol Accelerator C-5. The mixture was allowed to stand at room temperature overnight. The cured product was a well expanded cellular rubber having a density of 0.71 g. per cc.

A similar preparation cured at 70° C. for two hours gave a well expanded product having a density of 0.80 g. per cc.

As indicated, the invention is applicable also to alkali metal aluminum hydrides, and the alkaline earth metal aluminum hydrides, such as, for example, lithium aluminum hydride, sodium aluminum hydride, and calcium aluminum hydride. A direct synthesis of sodium aluminum hydride is described in Chem. and Engr. News (December 1961), page 45. Preparation of lithium aluminum halide is given in J. Am. Chem. Soc. 69, 1199 (1947). A reference to the preparation of sodium and calcium aluminum hydrides is Finholt et al., J. Inorg. Nuclear Chem., 1, 317–25 (1955) (C.A. 50, 2346). An example of the practice of the invention with a metal-aluminum-hydride-type chemical is as follows:

Example 10

50 g. of Thiokol LP-2 was combined with 0.1 g. of lithium aluminum hydride and 5.0 g. of Thiokol Accelerator C-5. The materials were thoroughly blended in a paper cup and allowed to stand overnight at room temperature. The material was found next day as a well-expanded and cured product, practically filling the cup. The specific gravity was found to be 0.46.

Having thus described my invention, what I claim and desire to protect by Letters Patent is:

1. A method of making an expanded, cured rubber product comprising incorporating into a liquid organic polysulfide polymer, which is a polyalkylene polysulfide containing sulfhydryl groups, an oxidative curative for said polymer and, as a blowing agent, a metal hydride-type compound selected from the group consisting of alkali and alkaline earth metal hydrides, alkali metal borohydrides, and alkali and alkaline earth metal aluminum hydrides, and subjecting the resulting mixture to a temperature within the range of from 10° C. to 100° C. whereby the said blowing agent decomposes under the influence of water released by the action of said curative in the said polymer to produce gaseous products capable of expanding said mixture, and the composition simultaneously cures to produce an expanded, cured rubber product.

2. A method as in claim 1, in which the mixture is expanded and cured at room temperature.

3. A method as in claim 1, in which the blowing agent is calcium hydride.

4. A method as in claim 1, in which the blowing agent is sodium borohydride.

5. A method as in claim 1, in which the blowing agent is potassium borohydride.

6. A method as in claim 1, in which the blowing agent is sodium hydride.

7. A method as in claim 1, in which the blowing agent is magnesium hydride.

8. A method as in claim 1, in which the blowing agent is lithium aluminum hydride.

9. A method as in claim 1, in which the blowing agent is sodium aluminum hydride.

10. A method as in claim 1, in which the blowing agent is calcium aluminum hydride.

11. A method as in claim 1, in which the oxidative curative is lead dioxide.

12. A method as in claim 1, in which the liquid organic polysulfide rubber is a condensation product of 98 mole-percent of bis-beta-chloroethyl formal and 2 mole-percent of 1,2,3-trichloropropane with sodium polysulfide.

References Cited in the file of this patent

UNITED STATES PATENTS

| | | |
|---|---|---|
| 2,518,454 | Elliott | Aug. 15, 1950 |
| 2,873,481 | Semegen | Feb. 17, 1959 |
| 2,951,819 | Wade | Sept. 6, 1960 |

OTHER REFERENCES

Thiokol—Thiokol Corporation, Trenton, N.J. Received in the Patent Office, June 18, 1948. Technical service bulletin #103, pages 1–4.